Figure 24:
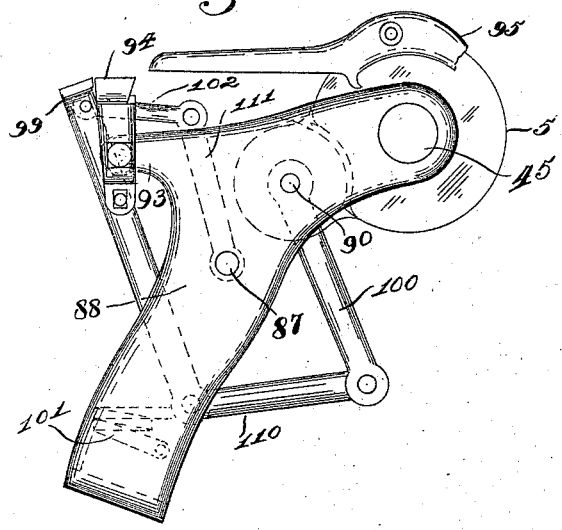

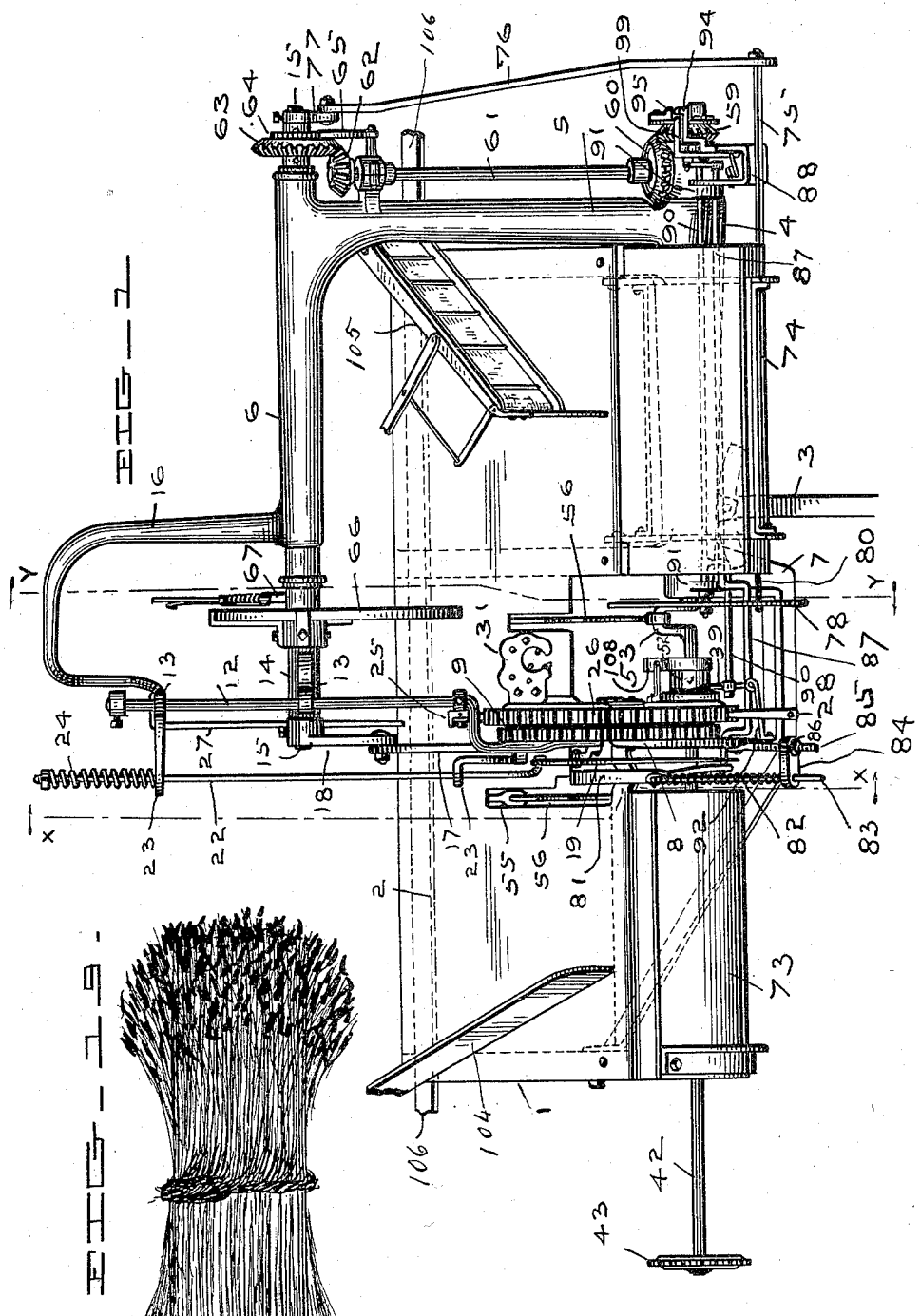

(No Model.) 6 Sheets—Sheet 2.
B. T. BROWN.
GRAIN BINDER.
No. 533,411. Patented Jan. 29, 1895.
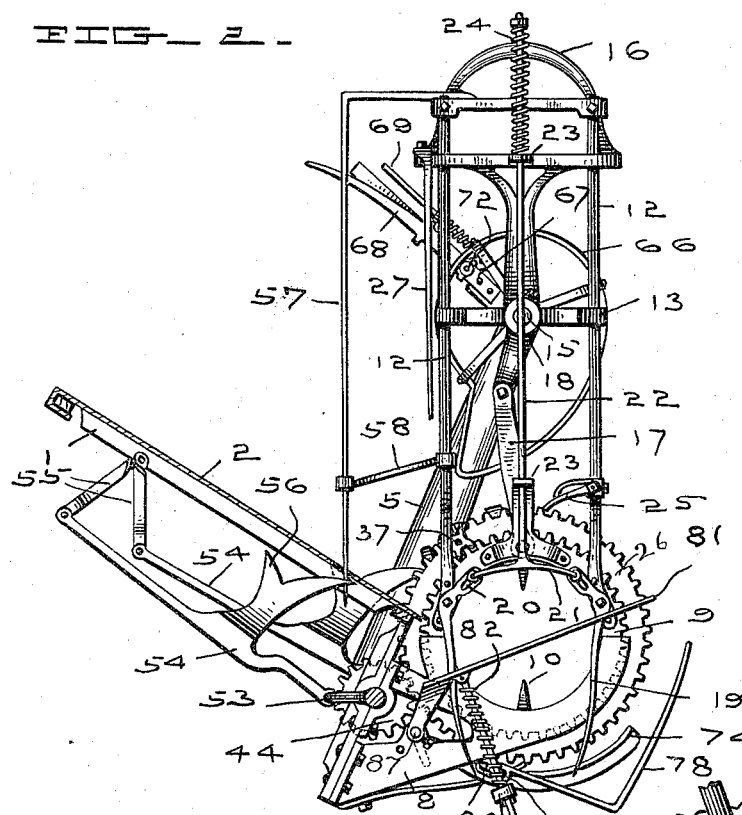
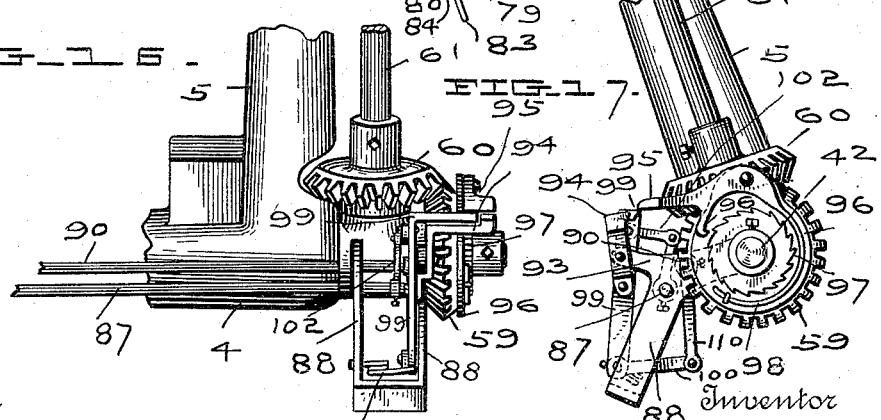
Witnesses
H. T. Nealy
J. H. Greene
Inventor
Brasetton T. Brown
By Attorney V. H. Lockwood (No Model.)    6 Sheets—Sheet 3.
B. T. BROWN.
GRAIN BINDER.
No. 533,411.    Patented Jan. 29, 1895.
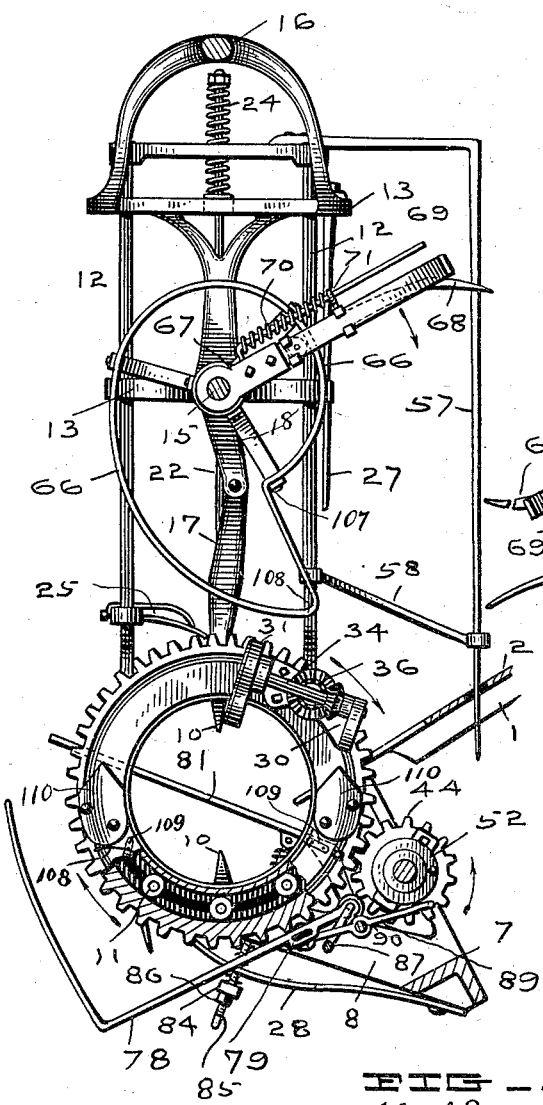
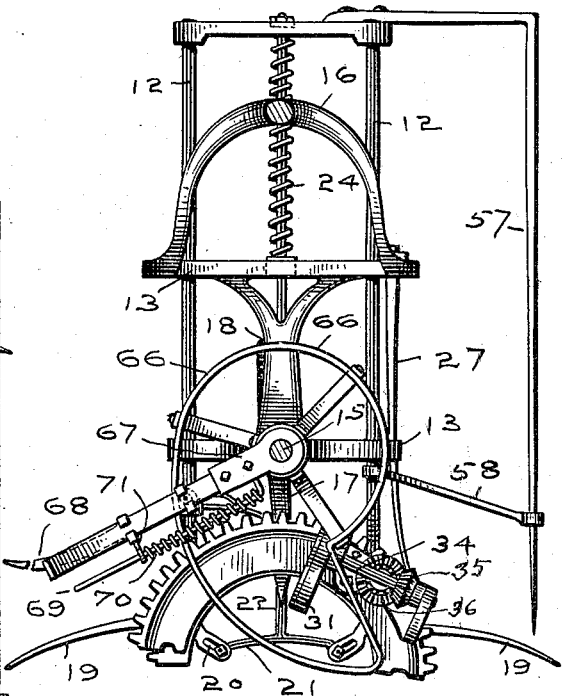
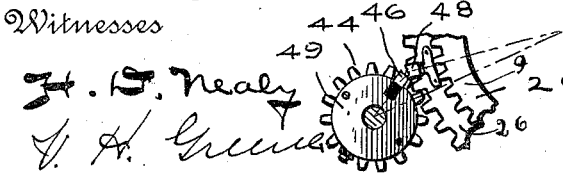
Witnesses    Inventor
H. F. Nealy    Braselton T. Brown,
T. H. Green    By Attorney V. H. Lockwood

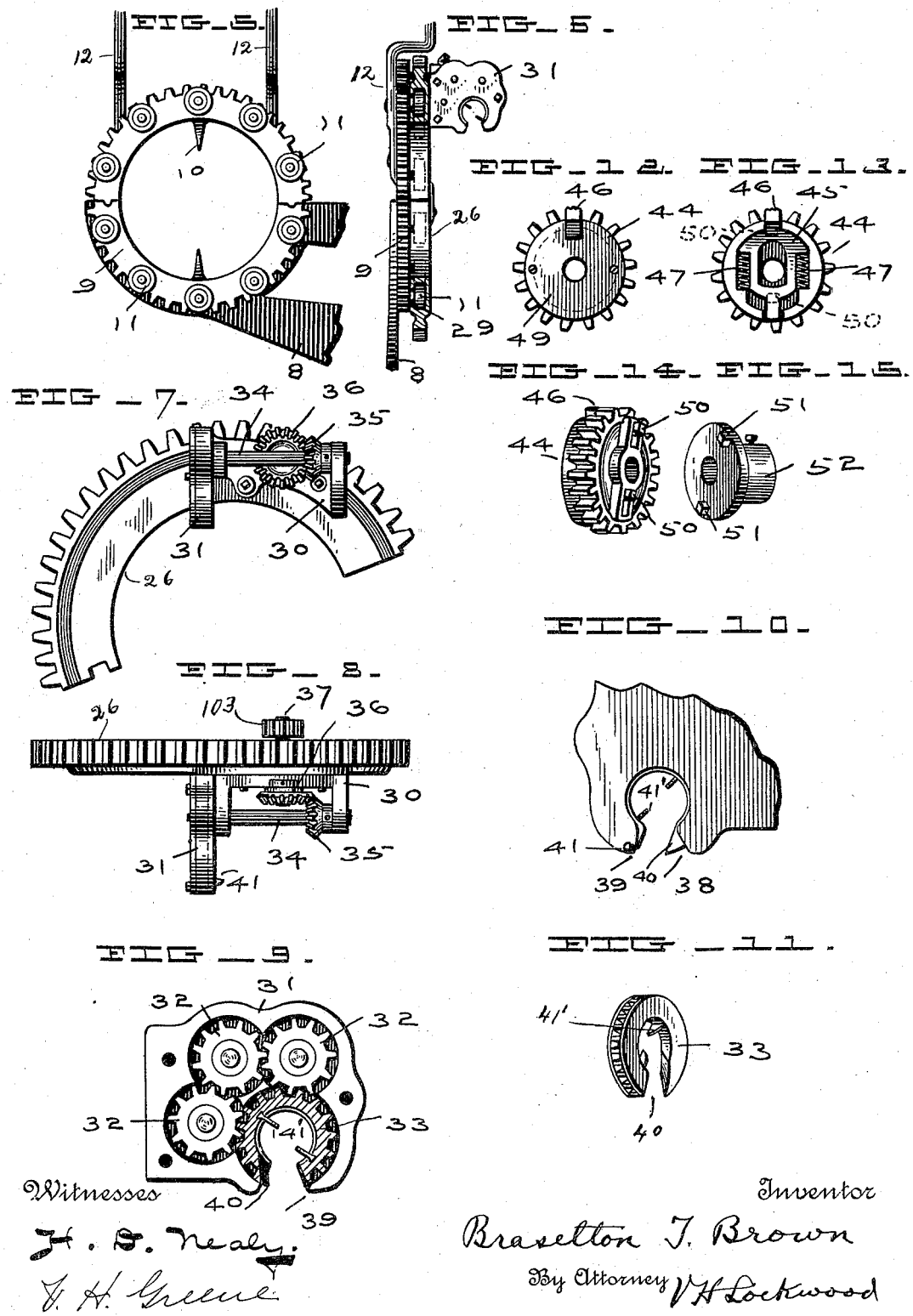

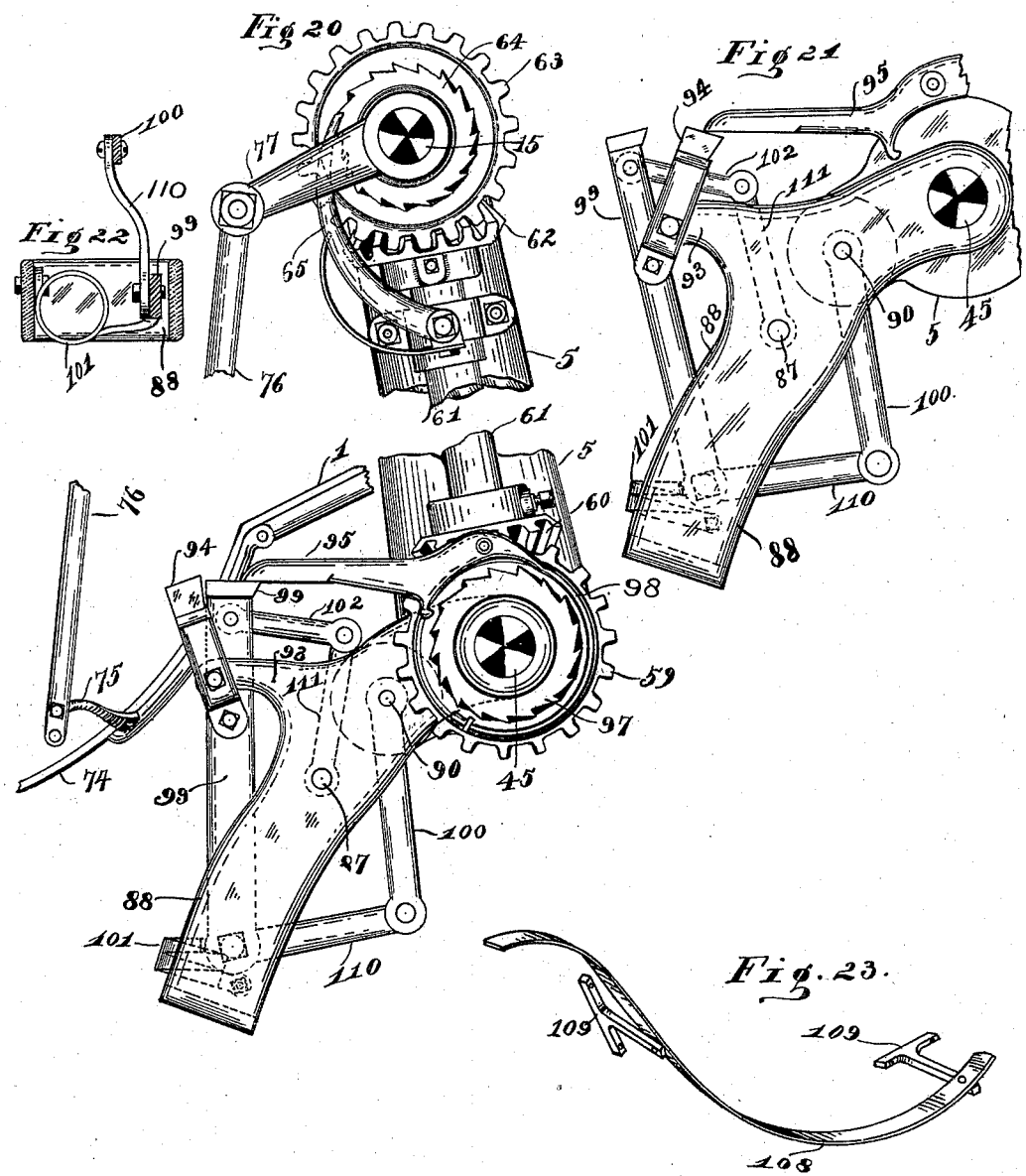

(No Model.)  
6 Sheets—Sheet 6.

B. T. BROWN.
GRAIN BINDER.

No. 533,411. Patented Jan. 29, 1895.

Witnesses  
A. S. Courtright  
Lela Monroe

Inventor  
Braselton T. Brown  
By Attorney V. H. Lockwood

UNITED STATES PATENT OFFICE.

BRASELTON T. BROWN, OF INDIANAPOLIS, INDIANA, ASSIGNOR TO THE BROWN STRAW BINDER COMPANY, OF SAME PLACE.

GRAIN-BINDER.

SPECIFICATION forming part of Letters Patent No. 533,411, dated January 29, 1895.

Application filed March 1, 1894. Serial No. 502,012. (No model.)

*To all whom it may concern:*

Be it known that I, BRASELTON T. BROWN, of Indianapolis, county of Marion, and State of Indiana, have invented certain new and useful Improvements in Grain-Binders; and I do hereby declare that the following is a full, clear, and exact description thereof, reference being had to the accompanying drawings, in which like figures refer to like parts.

My invention relates to new and useful improvements in straw binders of that class wherein a twister forms a rope around the bundle as the same is revolving and after tying or splicing such rope, the rope being formed from the butt half of straws on the surface of the bundle, it then discharges the bound bundle from the machine.

The advantages of a binder which utilizes the straws in the bundle to form a band are so apparent to everybody as compared with the present twine binders that no statement of such advantages need be made here.

My invention consists of several important features but few of which I can, in this part of the specification, describe.

One feature consists in having my binding ring or rings divided into two or more segments entirely free of each other and when it is desired to feed the straw into the ring or discharge the bundle from the ring, the upper segment of the ring is elevated or the lower one depressed. I prefer the mechanism shown herein which lifts the upper half of the binding ring vertically and entirely free from the straw and bundle. This is not only a convenient way of opening the ring but it enables me to better utilize power to compress the bundle as the downward pressure of the upper half of the ring is direct and vertical forcing the bundle into a small compact form.

Another feature of my invention consists in the twister or band forming mechanism. My twister is about one inch and a half in diameter and therefore is simple and cannot get out of order and will catch the surface straws and twist them into a rope. In the machine herein shown, I do without a tucker as my twister is so formed that by revolving the twister about the bundle more than one time it will take upon its second revolution the portion of the band formed in its first revolution and combine with it the end of the band which it was making at the close of the first revolution. This I call splicing, and the twister should revolve one and one half or two times about the bundle to accomplish this object.

Another feature of my invention consists in the peculiar means shown of throwing the binding mechanism in and out of gear but I cannot describe it in a general way.

Another feature of my invention consists in forming a trough along the lower edge of the inclined deck to receive the straw which is in line with the binding ring and making the trough supporting the butt end of the bundle oscillatory or hinged, whereby when the bundle is being bound, this part of the grain trough may be depressed so as to allow free movement of the straws on the surface of the bundle which are being gathered in by the twister. I have also combined with that a grain arm which prevents the grain entering the trough from falling over at the rear until the bundle is bound. I have also compressor arms to collect the loose straws on the periphery of the bundle before it is clasped into compact form and the rear of the compressor arms is used also to prevent the bundle from being kicked upward instead of backward by the discharging arm.

All of the features of my invention will appear more fully from the description following and the accompanying drawings.

Figure 25:
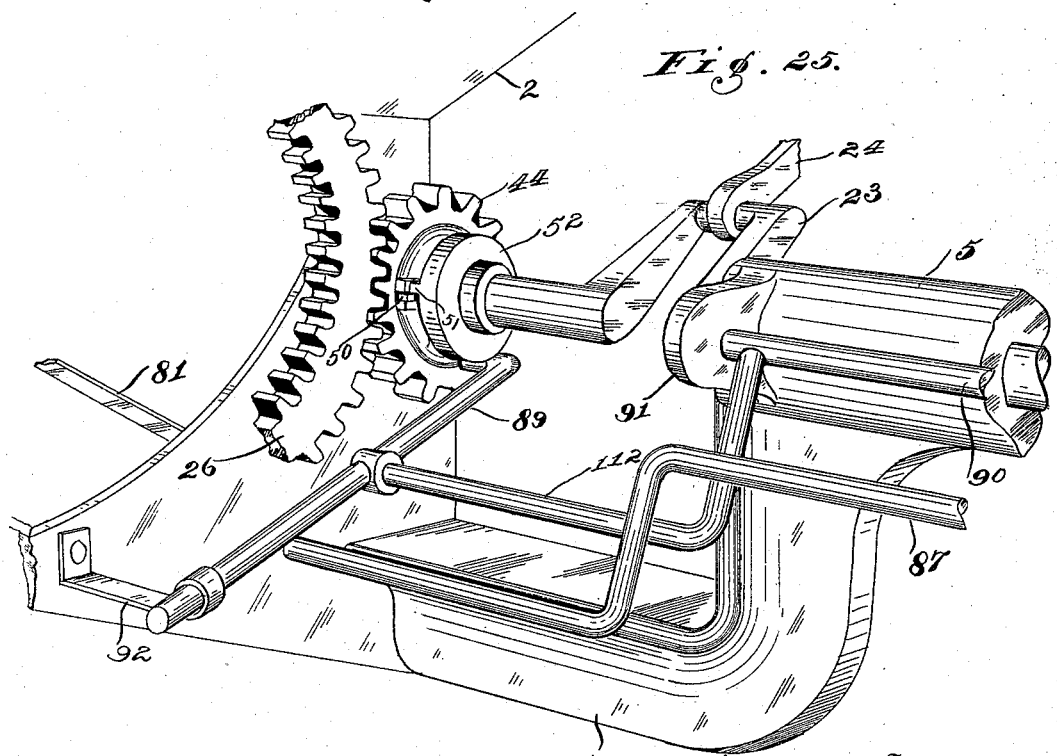

Figure 1 is a front view of the binding mechanism in connection with the deck of the machine. Fig. 2 is a section view of the same on the line *x—x* of Fig. 1. Fig. 3 is an enlarged vertical section on the line *y—y* of Fig. 1, the deck being broken away. Fig. 4 is a similar view, the upper half of both the fixed and binding rings being shown in a raised position. Fig. 5 is a detailed elevation of the fixed ring. Fig. 6 is an edge view of the same with a part of its rollers removed, the binding ring being shown in place in section. Fig. 7 is an enlarged detail view of the half of the revolving ring which carries the band forming mechanism. Fig. 8 is an edge view of the same. Fig. 9 is a rear view of the band forming mechanism, one side of the casing being removed. Fig. 10 is a detail which drives the binding ring, showing the casing in place. Fig. 13 is the same with the casing removed. Fig. 14 is a detail perspective view of the pinion. Fig. 15 is a similar view of the collar on the main shaft which engages the trip gear connected to the pinion. Fig. 16 is a front view of the tripping mechanism which throws in and out of gear the mechanism that raises and lowers the binding rings. Fig. 17 is an end view of the same.
Fig. 18 is a detail view of the tripping gear in the binding ring and its driving pinion. Fig. 19 shows a bound bundle, with the straws in the band drawn from the butt half. Fig. 20 is an end view of the gear and trip mechanism shown on the right hand end of Fig. 1, the connecting parts being broken away and the whole enlarged. The double trip is shown here in the position it occupies while the bundle is accumulating. Fig. 21 is an end view of the double trip mechanism enlarged, while the bundle is being bound. Fig. 22 is a detail plan view of the spring mechanism at the lower end of the double trip mechanism. Fig. 23 is a side view of the bundle supporting bracket 108 showing its shape. Fig. 24 shows the double trip mechanism in its third position between the time the rings begin to separate and before the bundle is discharged, and Fig. 25 is a perspective detail view of the mechanism which throws the ring elevating mechanism into gear when the bundle is bound.

I show the ordinary deck frame 1 having mounted on it the inclined deck 2 which is supported by the pivoted rocking post 3, also connected to the frame work of the harvester. An auxiliary frame or casting 4 is connected to the deck below and has a vertical arm 5 on the top of which is mounted a horizontal arm
6. These arms support the mechanism which raises and lowers the binding ring.

7 is a bracket or offset formed in the lower side of the frame work 4 and at about the center of the deck. See Figs. 3 and 4.

8 is a grooved arm connected to such bracket on one side and extending outward and having rigidly connected to it one segment of the fixed ring 9. See Fig. 2. The object of this ring 9 is primarily to furnish a track upon which the binding ring 26 rotates; but it also holds the bundle while being bound, having teeth 10 on its inner periphery which hold the bundle and prevent its turning. On its outer periphery, it is provided with cogs used for driving the band forming mechanism through the pinion 103. On the one face of this fixed ring are mounted friction wheels 11 on which the binding ring 26 is mounted enabling such ring to freely rotate.

The upper half of the fixed ring 9 is secured on the lower end of two vertical rods 12. See Fig. 2. These rods reciprocate in the guide 16 is a brace forming part of the guide frame 13.

The purpose of the guide rods 12 is to form a kind of frame to guide the vertical movement of the upper part of the fixed ring 9. Such upper part of the ring 9 is elevated and lowered by a crank and link mechanism mounted on the outer end of the auxiliary shaft 15, it consisting of a link 17 pivotally connected to the upper part of the ring 9 and the crank 18 rigidly mounted on the shaft 15. See Fig. 2. This construction causes the upper part of the fixed ring 9 carrying with it the upper segment of the binding ring 26 to have a directly vertical movement and to give the elevating and lowering mechanism a very great power especially while depressing the rings about the bundle. This is one of the important practical features of my machine. I have so geared my drive mechanism that it will operate this part of the device rapidly enough and yet give it tremendous power in causing the rings to compress the bundle.

The grain is fed into the binding ring while the same is elevated. When a bundle has accumulated, the pressure of the bundle on the trip 81 throws the upper part of the device in gear causing it to depress the binding ring. As this depressing process goes on, of course there are many loose straws which need to be drawn in to the binding ring. I accomplish this object by the compressor arms 19 as seen in Figs. 2 and 4. These arms are pivoted near their upper ends to the fixed ring 9, one on each side of its center. The ends of the arms 19 above their pivotal points are bent inward and are each provided with a slot 20 through which are loosely secured by nuts a grooved horizontal bar 21 which, at its center, is connected to the vertical rod 22. This rod works loosely through brackets 23, one secured to the outside of the fixed ring 9 and the other to the top of the guide frame 13, the rod extending up some distance above the upper bracket 23 and having about it a spiral spring 24 held on by the nut at the top of the rod.

It has appeared from this description that when the upper part of the fixed ring 9 is depressed, the spring 24 prevents the rod 22 from going down with the ring 9 whereby the rod through the bar 21 draws upward on the bent shank of the compressor arms thereby causing such arms to move toward each other and in such movement, they gather in all loose straws. When the bundle is bound and the upper part of the ring 9 is elevated, the refusal of the rod 22 to move upward as fast as the ring 9 causes the compressor arms, by an operation the reverse of what I have just described, to be thrown into an almost horizontal position as seen in Fig. 4. The rear arm 19 has an additional function inasmuch as it prevents the kicker or discharging arm of the machine from throwing the bundle vertically so that it might fall back on to the machine instead of being discharged from it to the rear.

26 is the binding ring mounted as I have stated above, upon friction wheels secured to the fixed ring. I make this ring hollow having an annular groove 29, see Fig. 6, opening into the inside of the ring from its inner face. The friction wheels 11 on the fixed ring operate in this groove; but the binding ring 26 may be mounted in any other suitable way so it has a support or bracket upon which it can rotate, the fixed ring being only such a bracket. This ring, like the fixed ring is divided into two segments or as I show here halves. One of these segments, that carrying the band forming mechanism is always elevated while the straw is being fed into the machine or the bundle discharged. To prevent the elevated segment of the binding ring 26 from turning backward, I mount a spring pawl on the rear rod 12 of the binding ring elevating mechanism.

28 is a long spring pawl mounted on the under side of the machine and adapted to engage the lower segment of the binding ring and hold it in place when the segments are separate.

In the machine I show the bundle as held stationary while the binding ring revolves about it and carries around the bundle the band forming mechanism. This band forming mechanism is mounted on the outer face of the upper segment of the binding ring 26, see Figs. 7 and 8, by means of the bracket 30. This bracket has formed on one of its ends a casing 31 which is at right angles to the face of the binding ring 26, and the inner edge of such casing should be flush with the inner periphery of the binding ring and the inner periphery of the binding ring should be slightly larger than that of the fixed ring 9, so that such binding ring will not clamp the bundle so tightly that the ring cannot freely rotate. The casing 31 is cored out as shown in Fig. 9 for the reception of the gear wheels 32 and the twister 33 mortised in and adapted to rotate in a suitable seat made for it in the casing. The twister has cogs on its outer periphery which engage two of the gears 32, the third being mounted on the shaft 34 thus geared in the arms of the bracket 30.

35 and 36 are bevel gears, the former on the shaft 34 and the latter on the shaft 37 which extends through and is mounted on the binding ring 26. On its outer end is the pinion 103 that meshes with the cogs of the fixed ring 5 so that when the binding ring 26 rotates, the cogs of the fixed ring 9 cause the pinion 103 to rotate and thus through the connecting gear the twister 33 is actuated. The under side of the casing 31 where the twister is located is cut out as seen in Figs. 9, 10 and 11. The outer point 39 of the casing formed by this slot is pointed or sharp. The function of this point 39 is to catch some of the straws on the surface of the bundle as the casing is being carried around the bundle and feed the same to the twister 33. The twister is a ring cut out on one side so that the slot in it will register with the slot in the lower part of the casing 31, whereby straws can pass through such slot into the middle of the twister. One point 40 of the twister, that opposite the point 39 of the casing, is sharp and beveled. The inner periphery of the twister has teeth 41' which extend on a line a little out of horizontal with each other, making them somewhat hooked.

41 is a pin or projection formed on the front of the casing 31 at the pointed end 39 and just opposite the sharp end of the twister in order that they may co-act. As the band forming mechanism is carried around the bundle, that is around the butt half of the bundle, the projection 41 of the casing catches some of the loose straws on the surface of the bundle, and the twister rapidly rotating causes the point 40 to take up the straw caught by the projection 41 and draw the same into the twister where the same are twisted into a rope by the rotation of the twister. The teeth 41' carry the straw around and twist it. This twister is about one and one half inches in diameter and might be made in any other form which would cause the twister as it rotates to twist the band, such for example, as a spiral slot instead of a round opening and in such case, the teeth 41' would be needless. This band forming mechanism must be so constructed, as shown in Fig. 9, that it will splice the band.

The machine I here show is adapted to splicing instead of tucking the band but it can be used with any ordinary tucker. By splicing the band, I mean that after the band forming mechanism has been carried around the bundle once the twister catches or takes up in its second revolution the band which it made in the first and twists in with the first part of that band the last part of it so that if it revolves one and one half times around there will be a splice from the end of the first revolution to the end of the operation. Thus in the case supposed, the splice would extend half about the bundle. It can be, however, carried around twice. The openings in the under side of the casing 31 and in the twister must therefore be large enough to enable the twister to take hold of the band on its second revolution and also to release the entire band when the bundle is discharged from the machine. When the bundle is so discharged, the straws in the twister are merely pulled out of it lengthwise.

While I have shown a device where the band forming mechanism is carried around a stationary bundle, still it would operate in the same way if such band forming mechanism were mounted stationary on the frame work of the machine so that it would contact with the surface of the bundle and have the binding ring to rotate the bundle instead of rotating a band forming mechanism.

I drive my binding mechanism by the main shaft 42 which is driven by a sprocket chain extending from the drive mechanism of the harvester over the sprocket 43. Near the middle of this main shaft 42, I mount the mechanism for driving the binding ring and at the end of it is found the mechanism which elevates and depresses the ring. Near the middle of this shaft 42 is a loosely mounted pinion 44, see Figs. 3 and 4, which is adapted to engage the cogs on the binding ring 26 and operate it. This pinion makes, preferably, three and a half revolutions to one of the ring 26. The pinion 44 with the means of throwing it in and out of gear are shown in detail in Figs. 12, 13, 14 and 15. The pinion is cored out on one side and is provided with a slide spring bolt 45 having a head 46 projecting from the outer periphery of the pinion on one side of its teeth. The bolt 45 is centrally slotted to work over the shaft 42 and 47 are spiral springs which bear against projections on the bolt and tend to hold the head 46 downward. The face plate 49 is secured to one side of the pinion 44 to inclose the mechanism just described. On each end of the spring bolt 45 are rigidly secured two laterally extending arms 50 that extend through radial slots in the pinion so that any movement of the spring bolt 45 causes a similar movement in the arms 50. Mounted rigidly on the shaft 42 close to the pinion 44 is a collar 52 having a clutch face provided with lugs 51 which are adapted to engage the laterally extending arms 50 above described when the spring bolt 45 is not depressed. When such bolt is depressed, the clutch face of the collar does not engage the pinion, so that the pinion does not turn. On the lower segment of the binding ring is a button 48 which engages the head 46 of the spring bolt 45. The binding ring and pinion are so geared that the button 48 and the bolt 46 would engage each other when the binding ring has made about two revolutions. When they engage, the spring bolt 45 is depressed which throws the pinion 44 out of gear, the lugs 51 passing without engaging the arms 50. This condition of the binding ring drive mechanism occurs when the bundle has been bound. At that point, the binding ring stops rotating, the lower segment stopping with the button 48 pressing on the bolt head 46 and remains that way until another bundle is ready to bind. The upper segment of the binding ring is elevated, as has been described, to let out the bound bundle and to let in a new one. As the upper segment is being elevated, the adjusting rod 27 which at its upper end is rigidly mounted to the guide frame 13, engages at its lower free end the cogs on the inner end of such upper segment, causing the latter to rotate inward about three inches. The pawl 25 holds the upper segment in place. When a new bundle is ready to bind and the upper segment is being depressed, the inner end of the upper segment will come in contact with the inner end of the lower segment before the rear ends of the same will. The crank and link 17 and 18 continue to push down the upper segment so as to cause its inner end to push down the inner end of the lower segment, partially rotating the latter. The purpose of this construction is to cause by the partial rotation of the lower segment the button 48 to disengage the bolt head 46, whereby the binding ring drive mechanism is thrown into gear and immediately begins to rotate the entire binding ring.

Without the rod 27 adapted to change the location of the upper segment as compared with the lower, when the rings came together, they would occupy the same position which they occupied when they separated so that the button 48 would not be pushed off the bolt head 46 and the pinion 44 would not be thrown into gear so as to operate the ring.

53 are cranks formed on the main shaft 42, see Fig. 2, one on each side of the binding ring. Connected to these cranks are the arms 54 each being pivoted at its rear end beneath the deck to a short link 55 which in turn is pivoted to the under side of the deck frame 1. Integral with the arm 53 are the hooked packers 56 which extend and operate through slots in the deck 2, and are geared so they will not operate in unison. These packers move or push the grain down the inclined deck into the binding ring. As to these, I claim no invention, they being in the ordinary form. I show also a drifting or a cut-off rod 57 which is vertical and which is secured to the frame or rods 12 by suitable arms 58. The purpose of this drifting or a cut-off rod is to hold back the straw on the upper part of the deck while a bundle is being bound. It is observed that at such time the rod extends down through the deck but, after the bundle is bound, the upward movement of the frame 12 whereby the binding ring is elevated, also lifts the drifting or a cut-off rod 57 and lets the grain which has collected against it be moved by the packers into the binding ring to form the next bundle.

As said before, the main shaft 42 extends entirely through the auxiliary frame 44 and at its outer end has mounted on it a beveled gear 59, see Fig. 16, which engages with a similar gear 60 on the lower end of the upright shaft 61 having bearings in boxings formed on the upright arm 5. 62, see Fig. 1, is a small beveled gear on the upper end of the shaft 61 and it engages a larger one 63 on the end of the auxiliary shaft 15 which I have heretofore mentioned. 64 is a toothed ratchet wheel mounted on the outer end of the shaft 15 and is engaged by the spring pawl 65 to prevent the parts from turning backward.

By the means which I have just described the whole mechanism of my binder is operated and the means of throwing the mechanism which elevates and depresses the binding ring out and in gear, I will describe later.

One important and novel feature of my invention consists in the construction of the discharging arm. To the stationary collar 14 on the outer end of the shaft 15 is secured a peculiar cam shaped ring 66. See Figs. 13 and 14. It is so located that it will escape the band forming mechanism on the binding ring. On the shaft 15 between the collar 14 and the arm 6 is mounted an arm 67. This arm is spliced or extended by an extension arm 68 working in guides formed on the arm 67. The rod 69 which is secured to the arm 67 has a spring 70 coiled around it spirally which bears against the projection 71 on the extension arm 68. A friction roller 72, see Fig. 2 is pivoted on the inner end of the extensible arm 68 and bears or runs on the inner face of the cam shaped ring 66. This ring 66, at its most extended portion extends downward and, as the arm 67 and extension arm 68 are rotated preparatory to discharging the bundle, as shown in Fig. 3, the friction wheel 72 on the extension arm 68, just before the arm is ready to touch the bundle will pass over the angular point 107 of the cam shaped ring and drop down to the lowest point. Then the extension arm 68 comes in contact with the bundle, and as it begins to push the bundle, the friction wheel 72 is carried at a slight angle forward on the back of the ring 66, causing the extension arm 68 to withdraw upward as it is moved backward, whereby it will, while pushing the bundle backward, also tend to lift the bundle upward out of the grain trough and binding ring. Just after it has discharged the bundle, it will be in the position shown in Fig. 4. The extension arm is curved somewhat at its lower end so that the action of this discharging arm is substantially the same as that of the human arm. As the friction wheels 72 passes the point 107 and drops to the lowest point of the ring 66, the arm is extended like the human arm is extended when it reaches for an object. The gradual uplifting combined with the rearward movement of the arm is also like that of the human arm if it were attempting to do the same work. The spring 70 drives the extension 68 outward whenever the cam ring 66 permits such movement.

Provided at the lower edge of the inclined deck there is a grain trough in line with the lower half of the binding ring. This trough is divided into two parts one half on each side of the binding ring. The part 73 receives the head of the grain, and the part 74 of this trough which receives the butt end of the straw, I hinge on its side next to the deck so that it will oscillate up and down. While the bundle is being bound, it is desirable that the surface straws be in nowise hindered from being drawn into the twister. If the bundle rested in the trough at that time, the twister probably would not catch enough straws. I, therefore, provide a rod 75 connected rigidly to the end of the trough 74 and the link 76 connecting this rod to the crank 77 rigidly secured to the outer end of the shaft 15. By this arrangement, when the mechanism depresses the binding ring preparatory to binding the bundle, the link 76 lowers the end 74 of the trough so that the butt end of the bundle will scarcely touch it. When the bundle is discharged, this same mechanism lifts up this end 74 in line with the ring 26 and the end 73 of the trough for the purpose of receiving straw for a new bundle.

To prevent the grain being fed through or over the rings 9 and 26 when it is bound, as shown in Fig. 4, I provide a grain hook 78 whose inner end is loosely pivoted to the auxiliary frame 4 of the binder at any suitable point and below the pivoted point of the end 74 of the grain trough. This grain hook 78 has a slot 79 through it in which works the projection 80 on the inner end of the end 74 of the grain trough. Thus the grain hook lies to one side of the binding ring and when it is opened as shown in Fig. 4, the hook will be in the position therein shown through its connection with the end 74 of the grain trough and prevent any grain from leaving the rings, but when the rings are closed as shown in Fig. 3., and the end 74 of the trough is lowered, the grain hook 78 at the same time drops down out of the way of the bundle to be discharged.

The mechanism used to depress the binding ring is thrown in gear by the trip lever 81 which extends across the grain trough. I show it along side of the binding ring but it can be located anywhere else in the grain trough inasmuch as its action is brought about by the pressure of the grain that is packed in upon it. When the accumulating grain amounts to a bundle, this trip lever 81 is depressed. The inner end of the trip lever is rigidly secured to the end of the rod 87, as seen in Fig. 1. Some distance from the inner end of the trip lever 81, there is pivoted to it a supporting rod 83., which moves loosely through the block 84 which is secured on the screw rod 85 and which can be adjusted to move up or down by the nut 86. The screw rod 85 is rigidly secured to the auxiliary frame 4. A spiral spring 82 is coiled about the guide rod 83 which tends to push the trip lever 81 forward into its normal position. As this trip lever 81 is pushed down by the accumulating straw in the binding ring, it turns a rod 87 and thereby, as hereinafter explained, the mechanism which depresses the binding ring is set in operation. It is seen therefore that the size of the bundle can be adjusted by turning the nut 86 so as to push the block 84 up or down and thereby raise or lower the normal position of the trip lever 81. If a small bundle is desired, the block is set down on the bolt 85 and vice versa. This trip lever as constructed, being spring supported, also co-operates with the discharging arm to discharge the bundle from the binding ring, inasmuch as when the upper segment of the binding ring is elevated, the spring 82 pushes the trip lever 81 up and it lifts up the bundle.

The rod 87 to which the trip lever 81 is secured has a bearing in the bracket 8 at one end and in the bracket 88 at the other end near the vertical arm 5. The bracket 88 is secured to the auxiliary frame work 4. Mounted on the shaft 42 at its outer end is a ratchet wheel 97 that lies against the gear 59. This gear 59 is loosely mounted on the shaft 15 and has pivoted to it a pawl 96 which is actuated by the spring 98. Integral with the pawl 96 is a dog 95 that is adapted to be engaged by the primary trip lever 99 with its top bent as shown in Fig. 16. The lever 99 is pivoted between its ends to the lower end of the secondary trip 94 while the trip 94 is pivoted between its ends to the arm 93 of the bracket 88. The link 102 and arm 111 connect the upper part of this trip to the rod 87. While the straw is accumulating in the lower half of the binding ring and the upper half of the binding ring is in an elevated position, the trip 99 is in the position shown in Figs. 17 and 20 where it engages the dog 95 and holds the pawl 96 out of engagement with the ratchet 97, so that the gear 59 does not rotate and the mechanism above is idle. When, however, a bundle has accumulated in the ring and has pressed down the trip lever 81 so far as to enable it, by turning the rod 87 through the arm 111 and link 102, to throw the trip 99 out of engagement with the dog 95, the pawl 96 will immediately, by force of the spring 98, engage the ratchet 97 and thus set in operation the mechanism which depresses the binding ring. As the trip 99 disengages the dog 95 and allows the latter to rotate with the gear 59, the movement of the trip lever 99 backward at its top causes the secondary trip 94 to move inward at its top by reason of its being centrally pivoted to the extension 93 on the bracket 88 and also pivoted at its lower end to the trip 99. By this arrangement, when the dog 95 comes around, it engages the head of the trip 94 which stops the dog, lifting the pawl 96 out of engagement with the gear 59 and thus stopping the mechanism which has been depressing the ring as seen in Fig. 21. The spring 101 as seen in Fig. 22 mounted in the lower end of the bracket 88 co-operates with the arm 111 and link 102 to move the trip lever 99 from the position shown in Fig. 20 to that shown in Fig. 21. As the segments of the binding ring come together and the bundle is pressed therein, the pinion 44 is set in operation as heretofore explained and the process of binding goes on until the bundle is bound. When the bundle is bound, the pinion 44 stops by being thrown out of gear as heretofore explained, and at the same time, one of the arms 50 of the spring bolt 45 being pushed outward toward the periphery of the pinion 44 by the pressure of the button 48 on the binding ring, this arm 50 engages and operates a finger 89 mounted on the crank 112 on the inner end of the rod 90 and held in place by the spring support 92. As the finger 89 is moved downward by the arm 50 of the spring bolt 45, the crank 112 is operated which turns the rod 90 that is mounted in the bearings 91 and rotates in the direction of the arrows in Fig. 24. This rod at its other end is mounted in the bracket 88 and an arm 100 is connected by a link 110 to the lower end of the trip 99. It having appeared that while the bundle is being bound, the pawl 96 is held out of engagement with the ratchet 97 by the secondary trip 94 engaging the dog 95, it will be seen that the rotation of the rod 90 will cause the arm 100 and the link 110 to pull the lower end of the trip 99 inward. As this is done the trip 94 is moved forward at its lower end and backward at its top until it is almost parallel with the trip 99 as seen in Fig. 24 and is out of engagement with the dog, letting the dog rotate again with the gear one time, but when it comes around, the trip 99 will be in place to engage it because the bundle has been discharged, the trip lever 81 has been pushed up by its spring whereby the rod 87 has been rotated back and the trips put in their original position as shown in Fig. 20. During this time, the gear 59 has been operating the shaft 61 whereby the mechanism above has lifted the binding ring up in its elevated position and there the machine again stops. It will be seen that this trip mechanism is perfect in its operation inasmuch as the trips permit the gear 59 to rotate once to depress the binding ring and then to stop it and afterward to rotate once to elevate the binding ring and then stop it, and these trips are operated from the mechanism near the binding rings.

The two positions which the double trip mechanism assumes are shown in Figs. 20 and 21. In the former is seen the position assumed while one segment of the binding ring is elevated and grain is accumulating in the lower segment. In Fig. 21 is seen the position assumed while the bundle is being bound.

In order to hold the butt of the bundle in place while it is being bound so as to keep that part of the bundle straight, I place a bracket 108 about four inches from the binding ring and support it by two rods or arms 109 secured to the lower segment of the binding ring. This is shaped, as shown in Fig. 4, like an ogee as seen in Fig. 23 so that as the ring revolves, the forward portion of the bracket will not interfere with the surface of the bundle but the rear portion of the bracket will tend to compress and hold in place the bundle. This construction is used to counteract the tendency of the pulling on the band by the twister. I also provide guard plates 110 secured to the ends of the lower segment of the binding ring. They are to assist in securing the joints between the segments clasping them, and also to keep the straw from getting into the joints. For this latter reason, they are made pointed. I provide also a head board 104 and a butter 105 both made and operated in a way heretofore known.

In Fig. 19, I show a bundle as bound. There it will be seen that the band is made of the butt half of the straws and that it is spliced, the spliced portion being larger than the other.

Little further need be said relative to the operation of this machine. While the number of separate parts is rather great, still the machine, as it is constructed, is simple and light in appearance. The arm 5 extends about two feet high and the arm 6 is about three feet long, ending directly over the binding rings. The binding rings are about ten inches in diameter. When the machine is started and while the bundle is forming, nothing operates but the main shaft 42 and the packers. At this time, the upper half of the binding ring, together with the fixed ring on which it is mounted, are elevated out of the way of the bundle. The grain hook 78 prevents the straw from being thrown over the lower half of the binding rings and the edge of the grain trough, 73 and 74. When a bundle has gathered, its weight and pressure on the trip lever 81 sets in operation, as heretofore described, the mechanism which depresses the elevated segment of the binding ring. As that ring comes down, the compressor arms 19 also compress together the loose straws of the bundle so that they will all come within the binding ring. The inner end of the upper segment of the binding ring coming in contact with the lower segment or the rear end, starts that lower segment to rotating whereby the trip mechanism connected with the pinion 44 is operated and that pinion set in operation, thus rotating the ring about the bundle of wheat which is held in the fixed ring 9. As the binding ring rotates, it carries about the surface of the bundle the band forming mechanism which gathers straws from the surface of the bundle and twists them into a band. At this time, the end 74 of the trough is dropped so that the twister can draw these straws into itself and form the band. After the binding ring has rotated about twice causing a splicing of the band by the twister, the trip mechanism heretofore described is operated whereby the pinion 44 is stopped and the mechanism which elevates the binding ring is simultaneously started. This lifts the binding ring off the bundle, the band pulling out of the twister. At the same time, the spring actuated trip lever 81 lifts the bundle up somewhat and the discharging arm 67 and 68 reaches down, picks up the bundle out of the grain trough, and throws it away from the machine. While the bundle is being bound, the drifting or cut-off rod keeps the grain back but as soon as the binding ring is opened and the bundle thrown away, the drifting rod is elevated and lets the grain be packed down into the grain trough, the end 74 of such trough at this time being elevated in line with the lower segment of the binding ring.

Without limiting myself to the specific form shown and described herein, what I claim as my invention, and desire to secure by Letters Patent, is the following:

1. In a grain binder, a binding ring composed of segments, means of rotating such ring when joined, and means of so separating the segments that the straw can be fed in between the segments at one side and the bundle discharged from between the segments at the other side of such ring.

2. In a grain binder, a binding ring composed of segments, an annular track on which such ring is adapted to rotate, such track divided into segments, and means secured to one segment of the track whereby it and a segment of the binding ring will be separated from the rest while the straw is being fed into the ring or a bundle discharged.

3. In a grain binder, a binding ring composed of segments, a fixed ring upon which such binding ring is so mounted as to be rotatable, such fixed ring being composed of an upper and lower segment, and means secured to a segment of the fixed ring for separating the segments of the fixed and binding rings while the straw is being fed into the ring or a bundle discharged.

4. In a grain binder, a binding ring composed of segments, a fixed ring divided into upper and lower segments, friction wheels mounted on such fixed ring and upon which is mounted the binding ring, and means secured to a part of the fixed ring for separating the segments of the fixed and binding rings while the straw is being fed into the ring or a bundle discharged.

5. In a grain binder, a binding ring composed of segments separable from each other, a guide way upon which such ring is adapted to operate, means of rotating such ring, and means of so separating the segments that the straw will be fed into the ring between the segments at one side and the bundle discharged from between the segments at the other side.

6. In a grain binder, a revoluble binding ring, a fixed compressor ring upon which such binding ring is mounted, teeth on the inner periphery of such fixed ring, and a band forming mechanism mounted on the binding ring and adapted as such ring rotates about the bundle to gather straws from its surface and form the same into a band.

7. In a grain binder, a twister consisting of a ring cut out on one side and provided with teeth on its inner periphery and means of rotating the same.

8. In a grain binder, a twister consisting of a ring cut out on one side, one point of such ring being sharp and beveled and adapted to catch straws as the same is rotated about the bundle, teeth on the inner periphery of such ring, and means of rotating the ring.

9. In a grain binder, a band forming mechanism consisting of a casing cut out on one edge and provided with a sharp point at such cut-out place adapted to catch the surface straws of a bundle, a twister mounted in a suitable seat in such casing, and gears within such casing adapted to operate such twister.

10. In a grain binder, a band forming mechanism consisting of a casing cut out at one edge and provided with a sharp point at such cut-out place adapted to catch the surface straws of the bundle, a twister ring mounted in a suitable seat in such casing, such ring being cut out on one side and provided with a sharp point adapted to draw the straws into the ring, and suitable gearing adapted to rotate such ring.

11. In a grain binder, a rotating binding ring, a fixed compressor ring upon which such binding ring is mounted, such compressor ring being provided with cogs, a band forming mechanism mounted on such binding ring, adapted to operate the same, gears connected to such binding ring and meshing with the cogs on the compressor ring, and means of rotating the binding ring whereby the gears meshing with the cogs on the compressor ring will be operated and thus operate the band forming mechanism.

12. In a grain binder, the combination of a binding ring 26, the fixed ring 9 provided with cogs on which fixed ring such binding ring is mounted, the casing 31 secured to the binding ring, the twister 33 mounted in a suitable seat in such casing, and the gears 32, the shaft 34 mounted on the bracket 30 and operated through the gears 35 and 36 by the shaft 37 which is driven by the pinion 103 meshing with the cogs of the fixed ring and means of rotating such binding ring.

13. In a grain binder, a rotary binding ring, a compressor ring on which such binding ring rotates, a band forming mechanism, secured to such binding ring means of rotating such binding ring more than once about the periphery of the bundle being bound, and a twister in such band forming mechanism consisting of a ring so cut out on one side that, when it has traveled about the bundle once, it will on its second revolution, take up the band before formed and twist into it the band being formed on such second revolution.

14. In a grain binder, wherein the band is formed from straws in the bundle being bound a revoluble binding ring composed of segments separable from each other, a shaft mounted in the frame work of the machine and extending over the binding ring, and a crank and link mechanism operated by such shaft and adapted to elevate a segment of the binding ring to enable straw to be fed into the ring from one side and a bundle discharged from between the segments at the other side.

15. In a grain binder, wherein the band is formed from straws in the bundle being bound a revoluble binding ring divided into segments, a suitable segmental track upon which such binding ring is mounted and adapted to rotate, an arm mounted on the frame work of the machine, a shaft mounted within such arm, and a crank and link-mechanism mounted on such shaft and connected to the upper part of the track upon which the binding ring is mounted.

16. In a grain binder, a binding ring composed of segments, a fixed ring upon which the same rotates, said fixed ring being composed of an upper and lower segment, an arm mounted on the frame-work of the machine and extending over the binding ring, a vertically movable frame mounted on such arm and secured at its lower end to the upper part of the fixed ring, a shaft mounted in such arm, and a crank and link mechanism connecting such shaft with the upper part of such fixed ring, whereby when the shaft is operated the ring will be elevated.

17. In a grain binder, a binding ring 26, a fixed ring 9 upon which such binding ring is mounted so as to rotate, both rings being formed in segments, an arm 6 mounted on the frame work, a shaft 15 carried in such arm, a crank 18 mounted on the outer end of such shaft, the link 17 connecting such crank with the upper segment of the fixed ring, a frame work 13 mounted on the free end of the arm 6, the rods 12 secured at their lower ends to the upper part of the fixed ring, and being vertically movable in such frame, the main shaft 42 adapted to be operated through the drive mechanism of the machine, and the intermediate shaft 61 adapted through suitable gears to transmit power from the main shaft to the auxiliary shaft 15.

18. In a grain binder, a binding ring formed of segments, mechanism for separating the same, a fixed arm mounted on the frame work and adapted to engage a segment of the ring before the segments come together and so adjust them that when they are joined, they will slightly rotate and throw the binding ring drive mechanism into gear.

19. In a grain binder, a binding ring, a main shaft, a pinion loosely mounted on such shaft and adapted to engage such ring, a spring bolt mounted in such pinion having a head extending radially outward beyond its periphery and two horizontal arms extending through radial slots in the pinion, a collar rigidly mounted on the main shaft having lugs adapted to engage the arms of the spring bolt when the latter is in its normal position, and a button on the binding ring adapted when the bundle is bound to engage the head of the spring bolt and throw its arms out of engagement with the lugs of the collar, whereby the binding ring drive mechanism will stop.

20. In a grain binder, a binding ring consisting of segments, mechanism adapted to lift one segment, a main shaft, a pinion mounted thereon adapted to turn the binding ring, a rod extending from the binding ring mechanism to the gear mechanism adapted to throw the ring elevating mechanism into gear, a crank on one end of such rod a spring supported finger on end of such crank adapted at times to engage an arm of the pinion turning the binding ring whereby such finger and the crank on which it is mounted will be operated and the rod partially rotated, a bevel gear mounted loosely on the shaft 42 and adapted when rotated to operate the ring lifting mechanism, a ratchet rigidly mounted to such shaft adjacent to such loosely mounted bevel gear, a spring actuated pawl pivoted on the side of such bevel gear and adapted to engage the ratchet and thereby rotate such bevel gear, a dog integral with such pawl, and a trip adapted to engage such dog and hold the pawl out of engagement with the ratchet, such trip being actuated by the rotation of the rod extending from the binding mechanism and when so actuated after a bundle is bound, to release the dog whereby the pawl engages the ratchet and thus the binding ring elevating mechanism is set in operation and a segment of the ring elevated.

21. In a grain binder, a binding ring formed of free segments, a main shaft, a pinion mounted loosely thereon, a spring bolt mounted in the pinion with a head extending radially beyond the periphery of the pinion, and horizontal arms extending through radial slots in the pinion, a collar rigidly mounted on the main shaft and having lugs adapted to engage the arms of the spring bolt when it is in its normal position, a button on a ring adapted to engage the head of the spring bolt and hold its arms out of gear with the collar, mechanism for separating the segments of the ring, a fixed arm adapted to engage the removable segment of the ring and so rotate it that the ends of the segments of the ring next to the pinion will unite before the opposite ends do, whereby the ring depressing mechanism will rotate the ring enough in joining it to cause the button to escape from the head of the spring bolt and throw the ring driving mechanism into gear.

22. In a grain binder, a binding ring composed of segments, mechanism adapted to elevate one segment, a main shaft, a pinion thereon adapted to operate the binding ring, a bevel gear loosely mounted on such main shaft adapted to operate the ring lifting mechanism, a ratchet rigidly mounted on such shaft adjacent to such bevel gear and adapted to be engaged by a pawl whereby such bevel gear will be operated, a dog integral with such pawl, a bracket mounted on the frame work, a trip centrally pivoted to such bracket and adapted to engage such dog and hold the pawl out of engagement with the ratchet, a rotatable rod mounted in the frame work, means for connecting one end of such rod to such trip, a crank on the other end of such rod provided with a finger adapted to be depressed by an arm in the pinion which turns the binding ring, such depression by rotating the connecting rod operating the trip and disengaging it when the bundle is bound from the dog whereby the pawl engages the ratchet and the ring lifting mechanism is set in operation, a spring actuated trip lever, adapted to be under the bundle, a rotatable rod rigidly connected to such trip lever, a second trip, and means of connecting such last mentioned rod to the second trip whereby when the bundle is discharged and the trip lever arises, such last named trip will stop the dog when it has made one revolution and thereby stop the ring lifting mechanism and hold the upper segment of the ring above the accumulating bundle of grain.

23. In a grain binder, a divided binding ring, means of raising and lowering a segment of such ring, a trip lever extending across the grain trough, a rotating rod to which such trip lever is rigidly secured at one end, a main shaft, a bevel gear loosely mounted on such main shaft and adapted to operate the ring elevating and depressing mechanism, a ratchet rigidly secured on such shaft adjacent to such bevel gear a spring actuated pawl pivoted on the side of such bevel gear and adapted to engage the teeth of the ratchet and cause the bevel gear to rotate, a dog integral with such pawl, a bracket secured to the frame work, an oscillating trip centrally pivoted to the lower end of a secondary trip, such secondary trip being centrally pivoted to such bracket, links connecting the end of such rotating rod to the upper end of the oscillating trip, whereby when the trip lever is depressed by an accumulating bundle and the rotatable rod is rotated, the lower end of the primary trip will be pushed out thus causing the secondary trip to disengage the dog and allow the pawl to engage the rachet and turn the ring depressing mechanism in order to unite the segments of the ring for binding and at the same time the head of the primary trip will be brought forward in line with the movement of the dog and stop it when it has gone around once, thus stopping the ring lifting mechanism.

24. In a grain binder, a binding ring formed of segments, mechanism adapted to separate such segments, a main shaft, a pinion mounted thereon adapted to rotate the binding ring, a spring bolt mounted in such pinion having a head extending radially beyond the periphery of the pinion, and horizontal arms extending through radial slots in the pinion, a button on the binding ring adapted when the bundle is bound to engage the head of the spring bolt, a rotatable rod having a finger at one end adapted to be engaged by an arm of the spring bolt in the pinion when such bolt is depressed whereby such finger and rotatable rod is partially rotated, and means whereby such rotation of the connecting rod will throw the ring separating mechanism into gear, whereby the segments of such ring will be separated.

25. In a grain binder, wherein the band is formed from straws on the periphery of the bundle being bound the combination with the deck and binding ring of the trough-like extension in line with the binder ring, such extension adapted to be raised or lowered, and means of operating the same substantially as and for the purpose shown and described.

26. In a grain binder, wherein the band is formed from straws on the periphery of the bundle being bound the deck, a hinged trough-like extension at the lower edge of such deck in line with the binding ring, a mechanism adapted to raise and lower the upper part of such binding ring and a link and crank mechanism connecting such extension to the shaft that operates such raising mechanism, whereby while the bundle is being bound such extension will be lowered and after the same is discharged will be elevated in line with the ring.

27. In a grain binder, a binding ring composed of segments, mechanism for separating the segments, compressor arms located beside such binding ring and means of so mounting such compressor arms on such separating mechanism that they will open as the ring opens and come together as the ring unites.

28. In a grain binder, a binding ring composed of segments, a fixed ring divided into segments, a frame work above the binder, a shaft mounted in such frame work, a reciprocating frame secured to the upper segment of the fixed ring, compressor arms pivoted on such upper segment of the fixed ring, a cross arm connecting their two ends loosely, and a spring controlled rod mounted in the frame work and secured to such cross arm whereby when the binding ring is elevated the rod and cross arm will be pushed downward, thus separating the compressor arms.

29. In a grain binder, a binding ring composed of free segments, a fixed ring divided into segments, suitable compressor arms mounted on such fixed ring, a frame work above the binder adapted to operate such compressor arms and change them from a vertical position when the bundle is being compressed to a horizontal position when it is bound, a discharge arm adapted to lift the bundle and discharge it, and a grain trough, such compressor arms being so located on the fixed ring that when the bundle is being discharged from the grain trough, one of such compressor arms while in its horizontal position will prevent the bundle from falling back into the grain trough.

30. In a grain binder, an inclined deck, a grain trough at the lower edge of such deck and means of raising and lowering the same, a grain hook pivoted to the frame work, its outer end extending up behind the grain trough so as to prevent any grain falling out of the trough while accumulating, such grain hook so secured to such movable grain trough that when the grain trough is elevated, the grain hook will be depressed and vice versa.

31. In a grain binder, in combination with the rotatable binding ring, a bracket mounted by arms to the side of such binding ring and adapted to support the bundle and hold the same in place while being bound.

32. In a grain binder, a binding ring, a grain trough in line with the binding ring divided into two sections and leaving a space between that for the binding mechanism, a bracket supported by arms secured to the binding ring and adapted to extend to about the middle of such space between the ends of the grain trough, such bracket being ogee shaped, whereby the bundle will be supported between the ends of the grain trough and also compressed as the shoe rotates around with the ring.

In witness whereof I have hereunto set my hand this 24th day of February, 1894.

BRASELTON T. BROWN.

Witnesses:
V. H. LOCKWOOD,
ALBERT S. COURTRIGHT.